US011383915B1

United States Patent
Vercruyssen

(10) Patent No.: US 11,383,915 B1
(45) Date of Patent: Jul. 12, 2022

(54) PORTION DISPENSING CONTAINER

(71) Applicant: Dart Industries Inc., Orlando, FL (US)

(72) Inventor: Alec Vercruyssen, Aalst (BE)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 17/381,765

(22) Filed: Jul. 21, 2021

(51) Int. Cl.
*G01F 11/00* (2006.01)
*B65D 83/06* (2006.01)
*B65D 25/02* (2006.01)

(52) U.S. Cl.
CPC .............. *B65D 83/06* (2013.01); *B65D 25/02* (2013.01)

(58) Field of Classification Search
CPC ................................ B65D 83/06; B65D 25/02
See application file for complete search history.

(56) References Cited

U.S. PATENT DOCUMENTS

| | | | | |
|---|---|---|---|---|
| 702,083 | A * | 6/1902 | Wormwood | B67D 1/06 222/289 |
| 1,419,338 | A * | 6/1922 | Wienekejohn | G01F 11/18 141/358 |
| 2,561,696 | A * | 7/1951 | Hammer | G01F 11/18 222/449 |
| 4,130,149 | A * | 12/1978 | Hausam | A47G 19/34 141/358 |
| 4,166,487 | A * | 9/1979 | Spies | G01F 11/18 141/358 |
| 4,232,718 | A * | 11/1980 | Wippermann | G01F 19/002 141/358 |
| 6,929,158 | B2 * | 8/2005 | Smiley | G01F 11/18 222/440 |
| D650,239 | S | 12/2011 | Laib | |
| D773,251 | S | 12/2016 | Shirley | |

FOREIGN PATENT DOCUMENTS

| | | | | |
|---|---|---|---|---|
| CN | 110329668 A | * | 10/2019 | ........... B65D 81/266 |
| WO | WO-9300572 A1 | * | 1/1993 | ............. A47G 19/34 |

\* cited by examiner

*Primary Examiner* — Paul R Durand
*Assistant Examiner* — Bob Zadeh
(74) *Attorney, Agent, or Firm* — Taylor J. Ross

(57) ABSTRACT

A portion dispensing container. The container includes a base supporting a hopper to store the food, with a cover sealing the hopper. A cup may be inserted into and removed from the base, and interacts with a slider to dispense a predetermined quantity of food into the cup upon each insertion. The hopper may include a scraper portion to assist in closing off the flow of food from the hopper during dispensing.

10 Claims, 12 Drawing Sheets

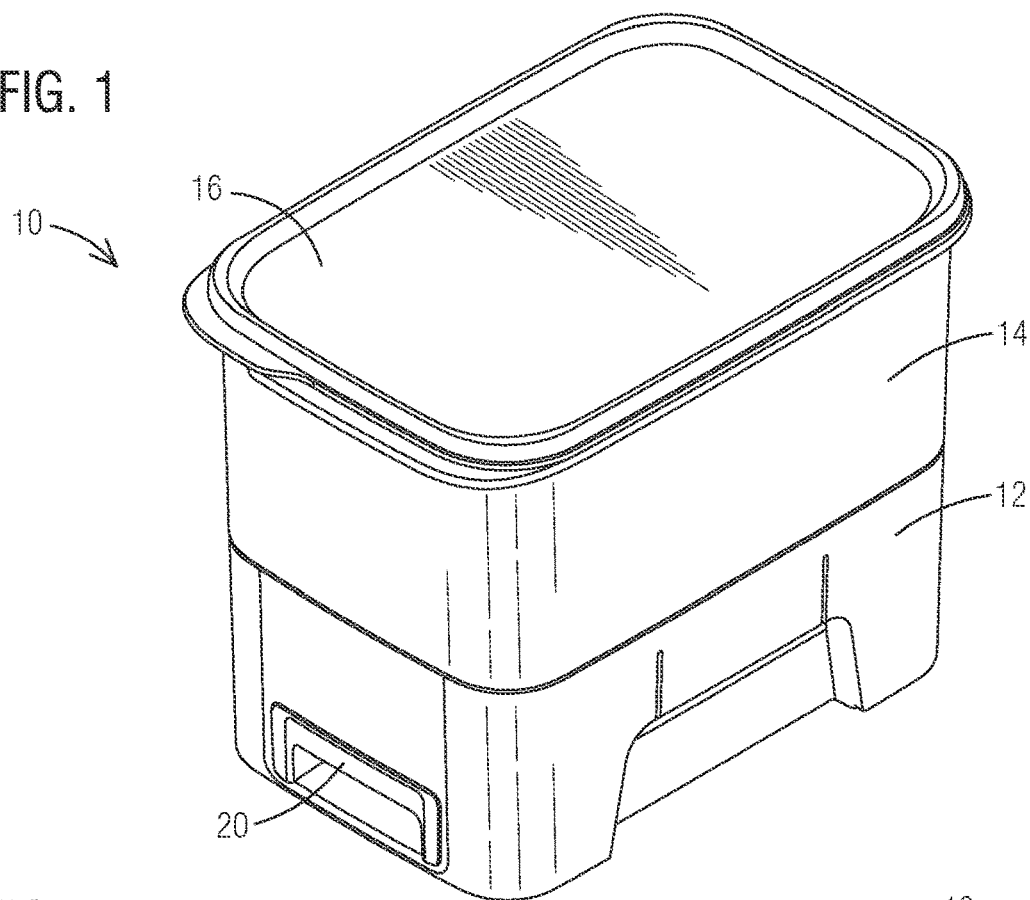
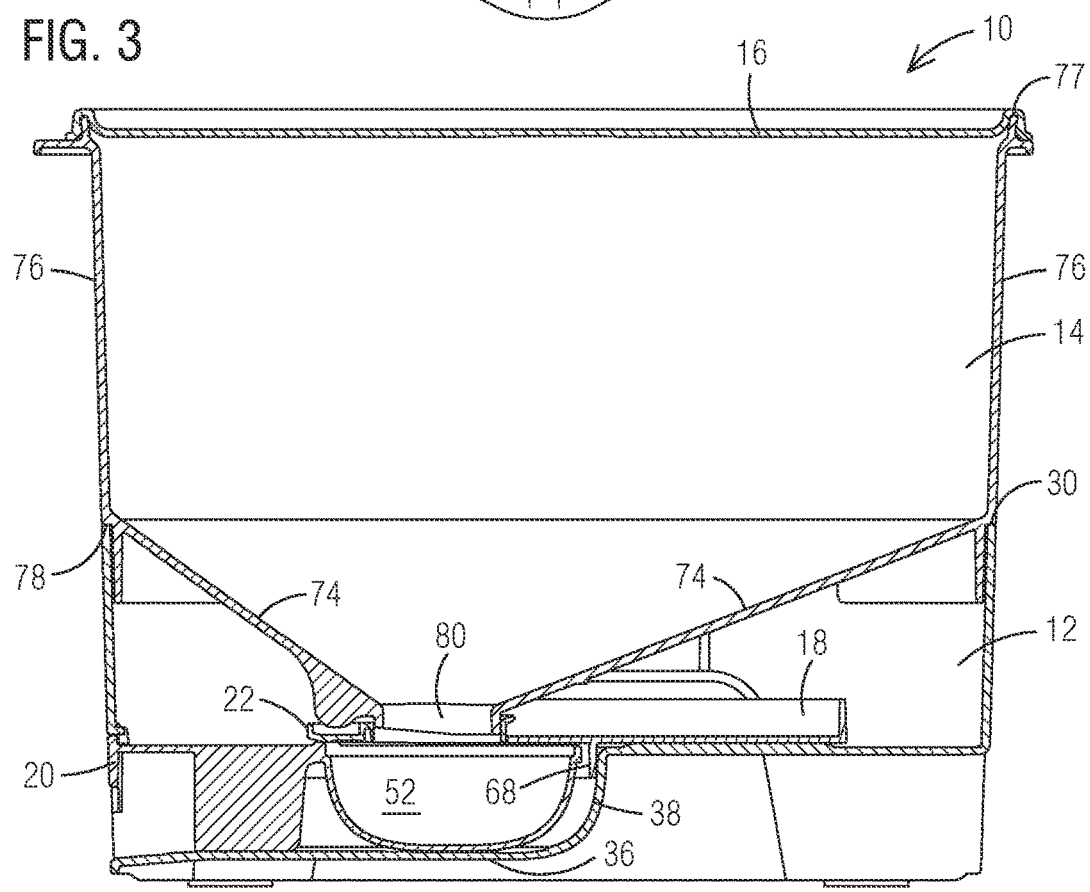

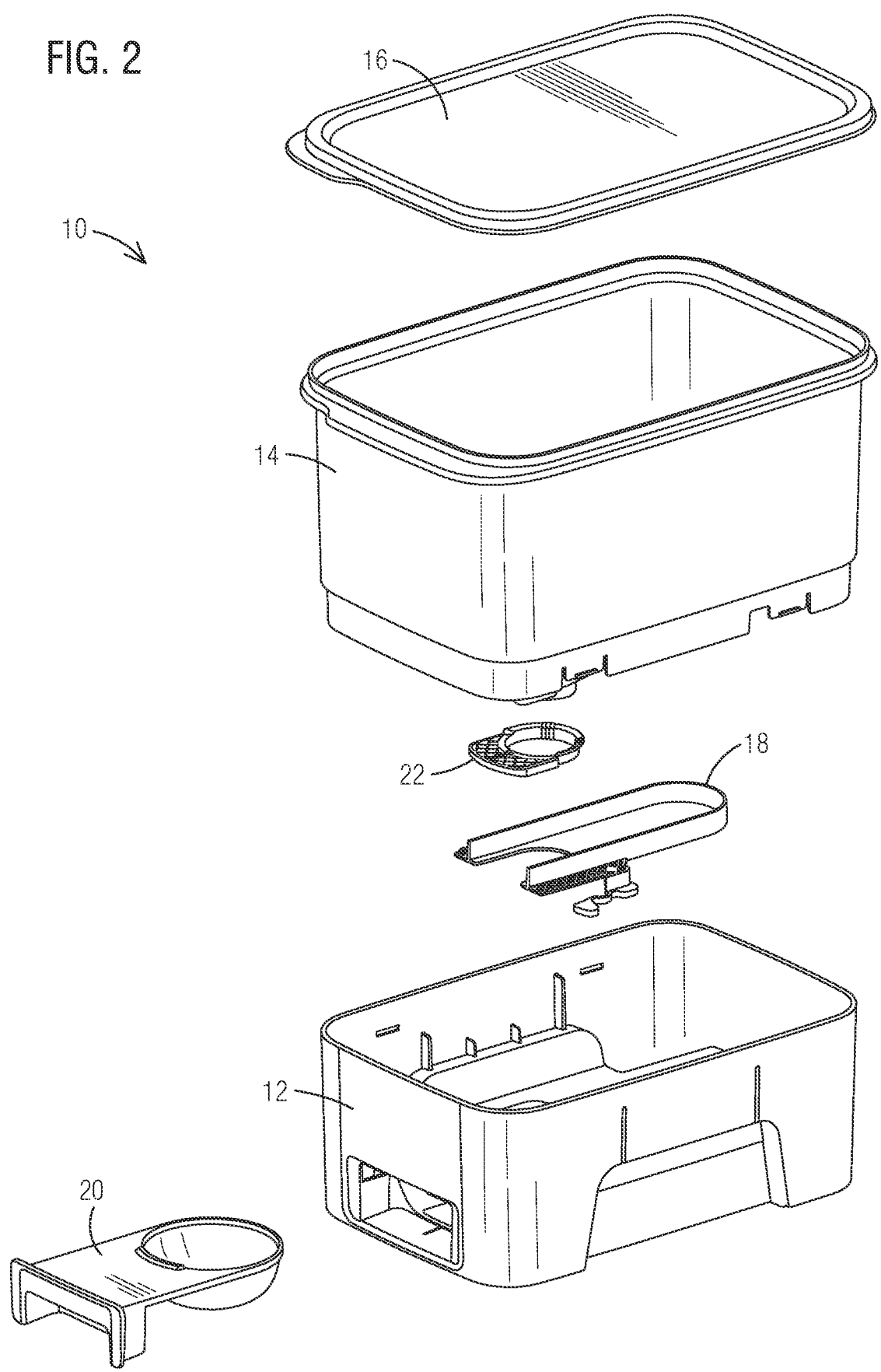

PORTION DISPENSING CONTAINER

CROSS REFERENCE TO RELATED APPLICATIONS

This application is related to co-pending Ser. No. 29,800, 476, which is incorporated by reference herein.

STATEMENT REGARDING FEDERALLY SPONSORED RESEARCH

Not applicable.

BACKGROUND OF THE INVENTION

The present invention relates in general to portion dispensing containers for dry food, commonly known as dispensers, and in particular dispensers for granular dried foods such as rice.

It is common for households to store dry foods in quantity for consumption over time. For this purpose, it is known to provide storage containers. For many such foods, it is also preferred to remove the food from storage in specific increments, such as pre-set servings.

SUMMARY OF THE INVENTION

An object of the present invention is to provide a dry food storage dispenser.

Another object of the present invention is to provide a dry food storage dispenser which dispenses the food in preset increments.

A further object of the present invention is to provide a dry food storage dispenser easily manufactured using injection molding.

These and other objects are achieved by a dry food storage dispenser. The dispenser includes a base supporting a hopper to store the food, with a cover sealing the hopper. A cup may be inserted into and removed from the base, and interacts with a slider to dispense a predetermined quantity of food into the cup upon each insertion. The hopper may include a scraper portion to assist in closing off the flow of food from the hopper during dispensing.

BRIEF DESCRIPTION OF THE DRAWINGS

The objects and features of the invention noted above are explained in more detail with reference to the drawings, in which like reference numerals denote like elements, and in which:

FIG. 1 is a top perspective view of the portion dispensing container according to the present invention in the operative configuration;

FIG. 2 is an exploded top perspective view thereof;

FIG. 3 is a side cross-sectional view along line 3-3 of FIG. 1;

DETAILED DESCRIPTION OF THE INVENTION

Figure 24:
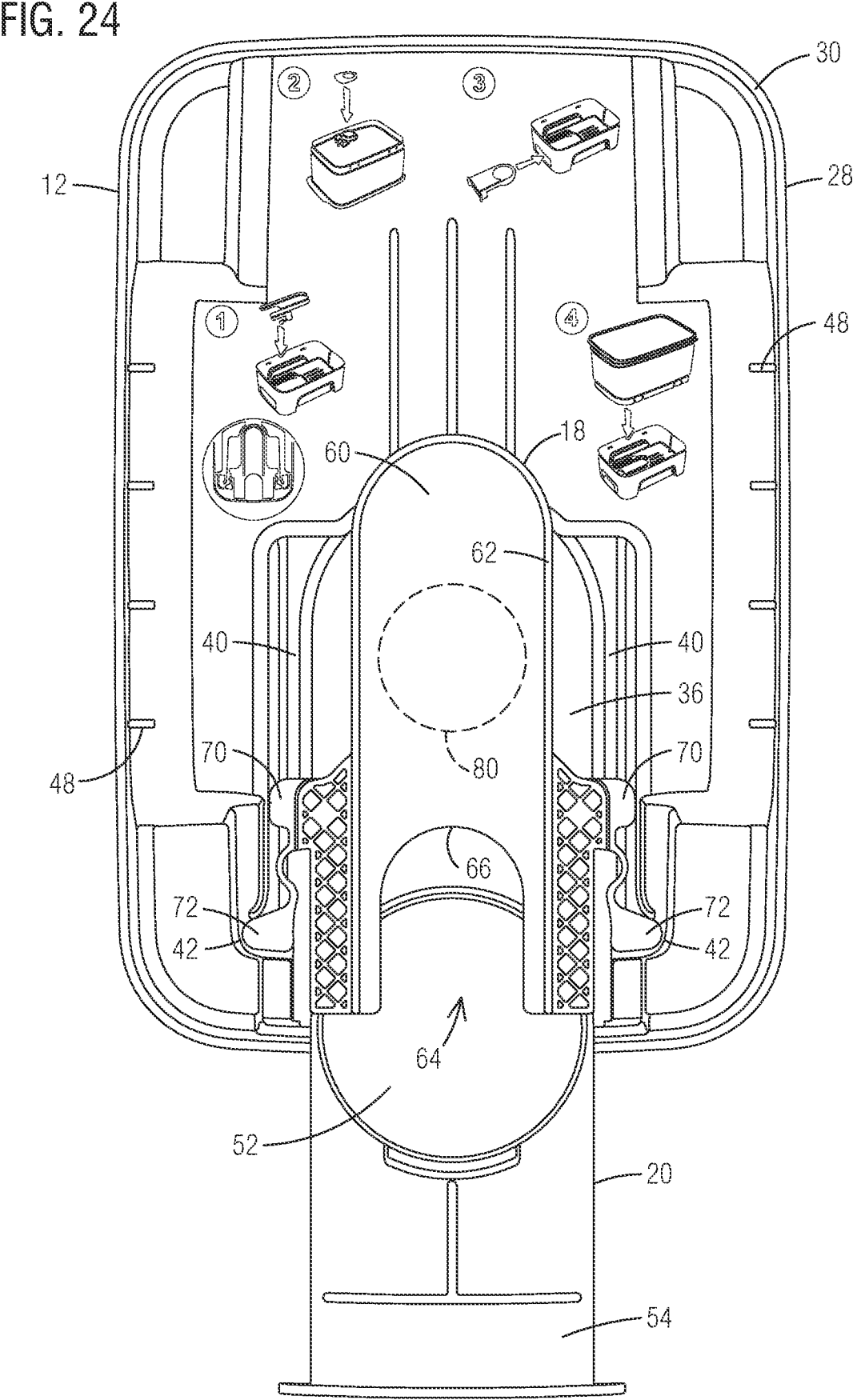
FIG. 24 is a detail top view of slider and cup in the dispensing position.

With reference to FIG. 1, a portion dispensing container (also referred to herein as a "dispenser" for brevity) according to the present invention is generally designated by reference numeral 10. With reference also to FIG. 3, the dispenser 10 generally includes a base 12, hopper 14 with cover 16, as well as a slider 18, cup 20 and scraper 22. These elements work together to safely store, as well as dispense, dry food 24 (FIG. 24). In general, the dry food 24 will be stored within the hopper 14 with the cover 16 preventing contamination. The hopper 14 is supported by the base 12, but the base 12 also works with the slider 18, cup 20 and scraper 22 to dispense set quantities of dry food 24 from the hopper 14.

Figure 7:
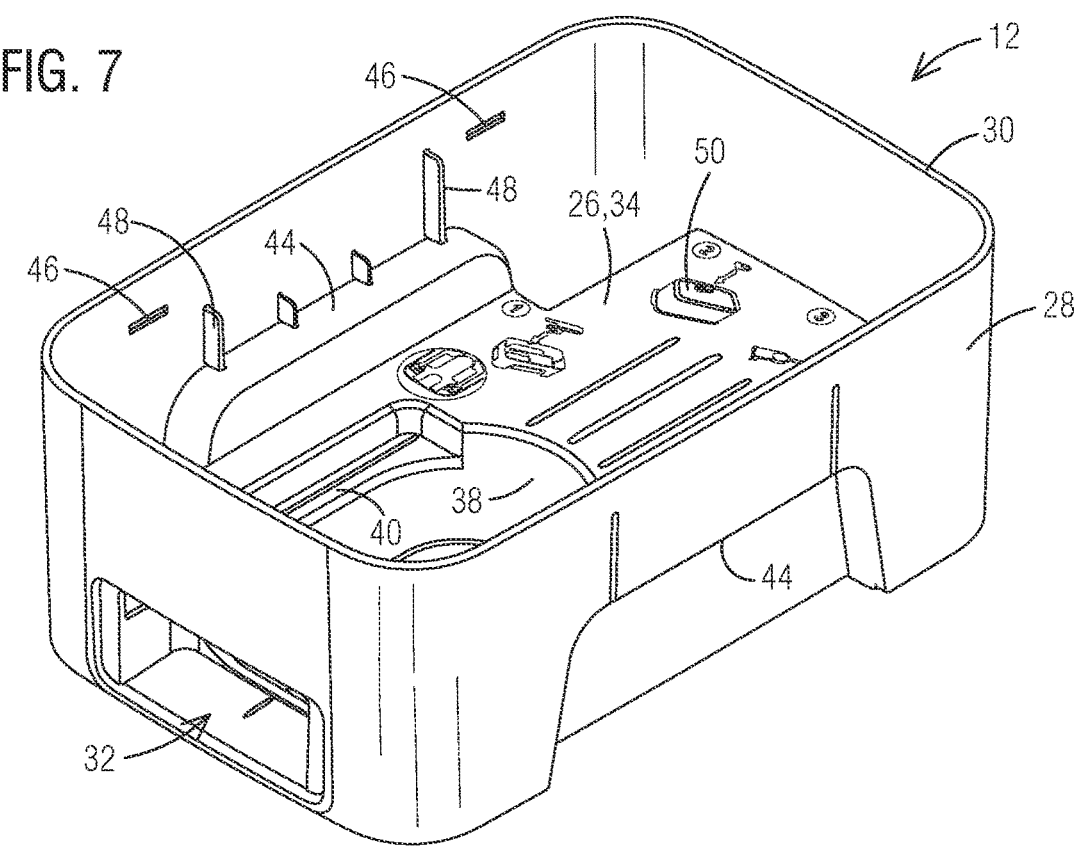
FIG. 7 is a top perspective view of the base.
Figure 8:
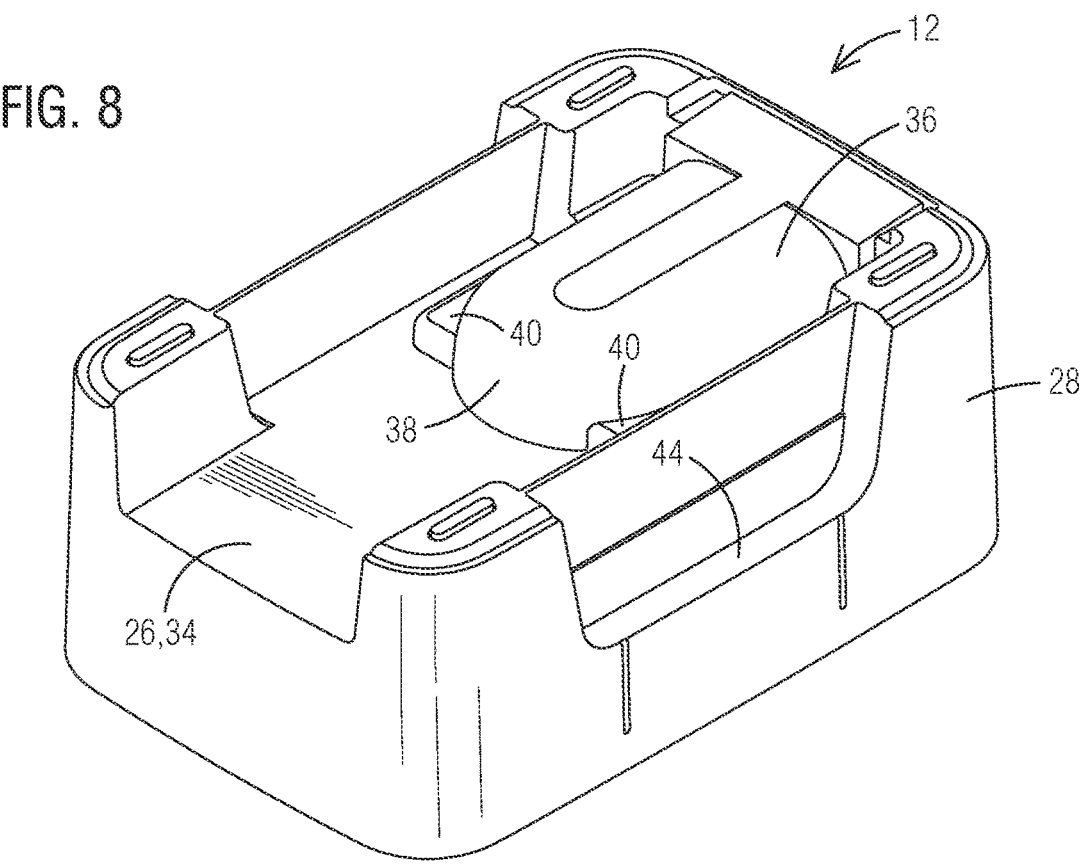
FIG. 8 is a bottom perspective view of the base.

With reference to FIGS. 7 and 8, the base 12 include a bottom wall 26 and at least one side wall 28 extending up from the periphery of the bottom wall 26. The side wall 28 extends upward to a rim 30, and the side wall 28 also includes an aperture in the form of a cup opening 32. While various shapes are possible, the preferred form of base 12 is shown as a generally rectangular bottom wall 26 with four side walls 28 and the cup opening 32 extending through one of the longitudinal end walls.

The interior of the base 12 cooperates with the slider 18 and cup 20 for operation of the dispenser 10. This interior of base 12 includes a platform 34 at near the same height as the upper edge of the cup opening 32. Taking the cup opening 32 as the starting point, and moving inward of base 12 from the cup opening 32, there is a cup slot 36 sized to receive the cup 20 when cup 20 is inserted through the cup opening 32. The cup slot 36 therefore has its lower extremity near the same height as the bottom edge of cup opening 32. The cup slot 36 also has an inner closed end 38 positioned such that a significant portion (and preferably essentially the entirety) of the cup 20 may be received and stored within the cup slot 36. In the preferred embodiment shown the cup slot includes a semi-circular bottom and the closed end 38 is semi-circular as well, so as to closely receive the similarly shaped cup 20 (described more fully below).

Figure 4:
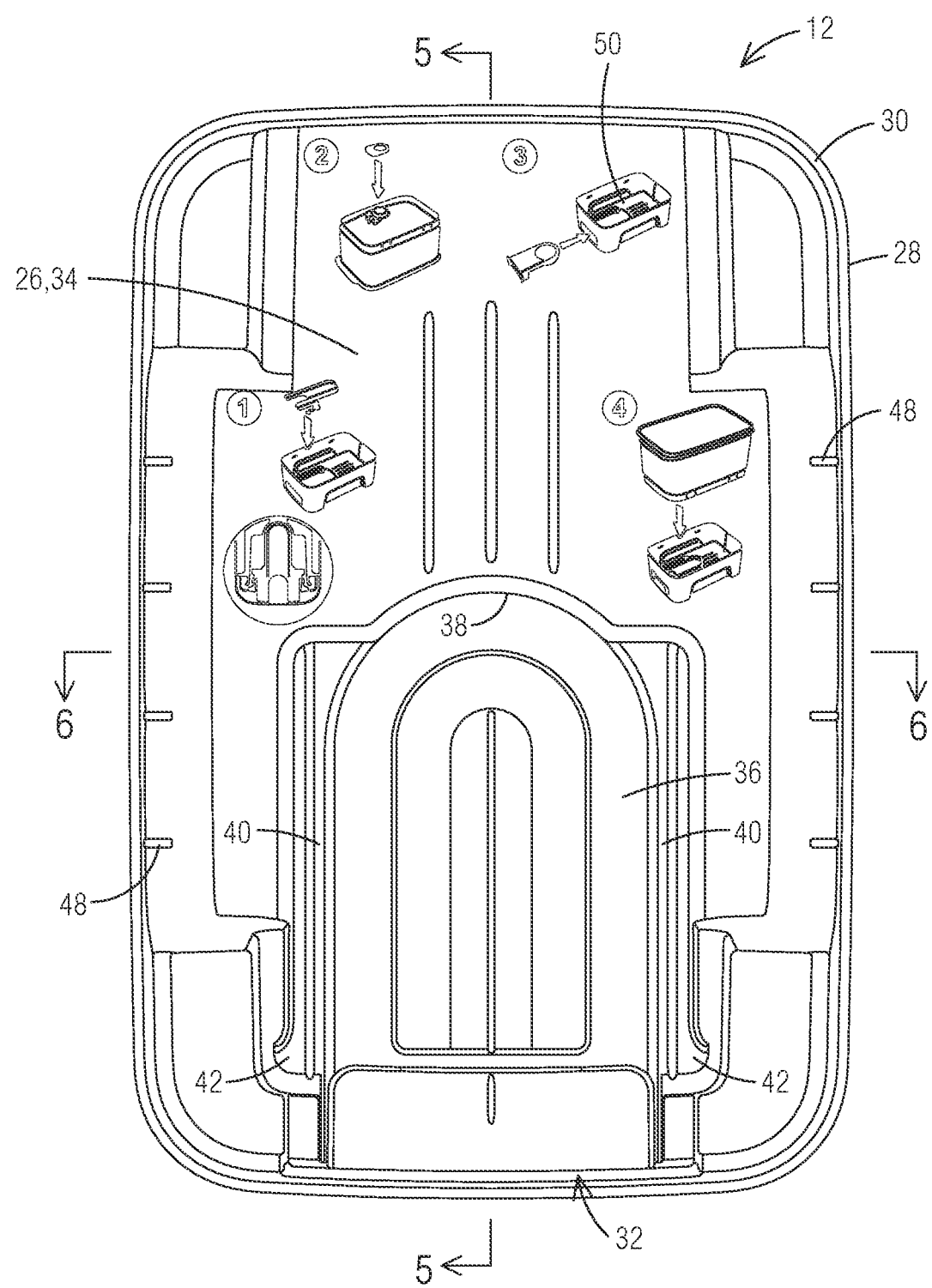
FIG. 4 is a top view of the base.
Figure 5:
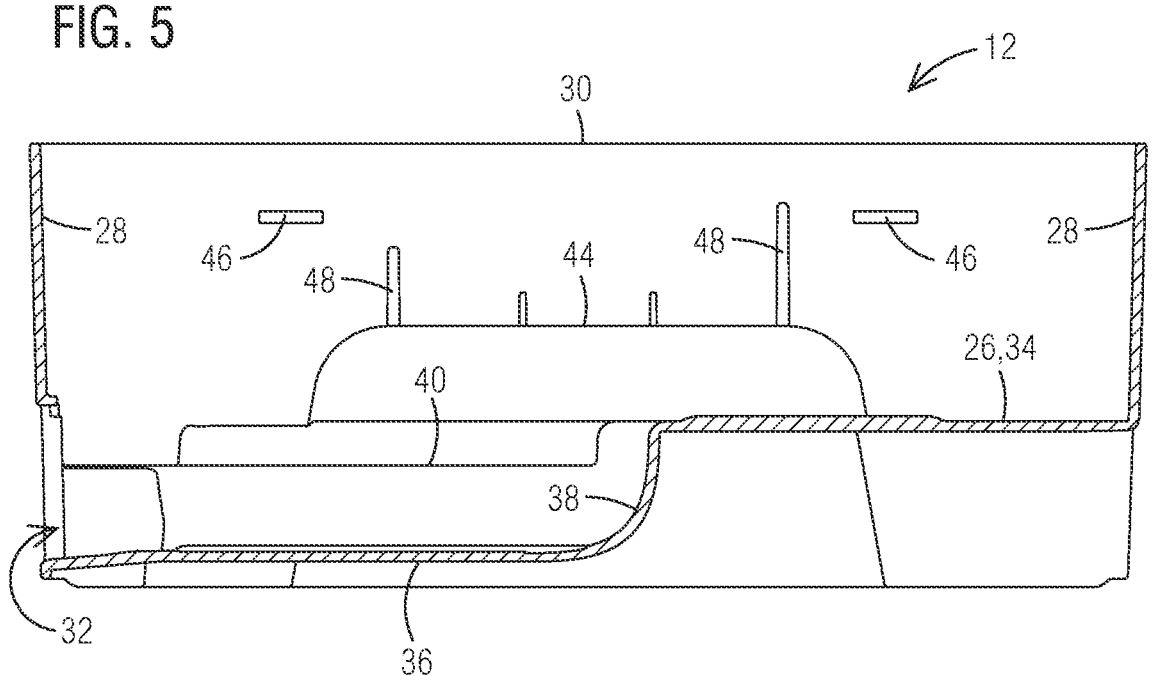
FIG. 5 is a cross-sectional view a long line 5-5 of FIG. 4.

On at least one side of the cup slot 36, at the intersection of the cup slot 36 and platform 34, there is formed a cam ledge 40. In the preferred embodiment shown, there are two cam ledges 40, one on each side of the cup slot 36. Further, in the preferred embodiment shown the cam ledges extend downward from the platform 34 but other arrangements are possible. As is best shown in FIGS. 4 and 5, the at least one cam ledge 40 extends from near the closed end 38 of cup slot 36 towards the cup opening 32. However, the at least one cam ledge terminates prior to the cup opening 20 by opening outward at a free end 42. In the embodiment shown, the free end 42 is formed by a lateral opening of the vertical walls of the cam ledges 40, but other arrangements such as a vertical opening of a horizontal wall of the cam ledges could be used alternatively or additionally.

Figure 6:
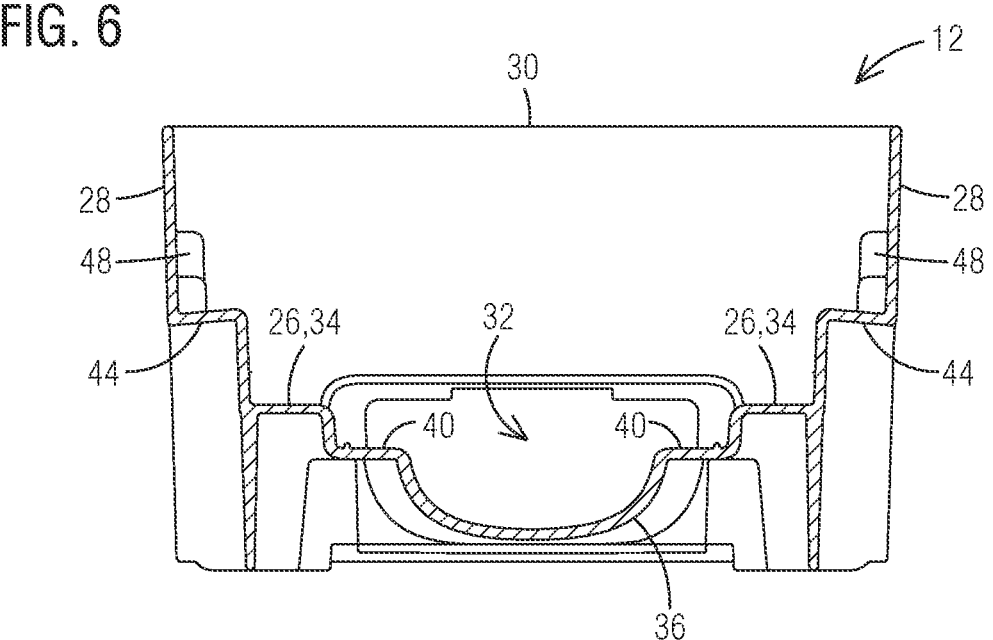
FIG. 6 is a cross-sectional view a long line 6-6 of FIG. 4.

Various other details or options for the base 12 are possible. The base 12 may include one or more handles 44 to allow a user to manually lift the entire dispenser 10. The base 12 (and hopper 14) may include several mating slots and detents 46 to allow the hopper 14 to be releasably latched to the base 12 to reduce the possibility of tipping over. The base 12 may include various alignment ribs 48 which are arranged so as to require proper alignment of the hopper 14 to the base 12 to ensure proper assembly. Similarly, the base 12 (or other components such as the hopper 14) may include indicia 50 illustrating proper assembly. Finally, in the preferred form the base 12 including all its features such as platform 34, cup slot 36, cam ledges 40, handles 44, etc. are all formed monolithically via injection molding, with this being best illustrated in FIGS. 5, 6 and 8. While this is preferred it is not required, and the platform 34, cup slot 36, etc. could be formed as one or more separate elements held to or within the base 12.

Figure 9:
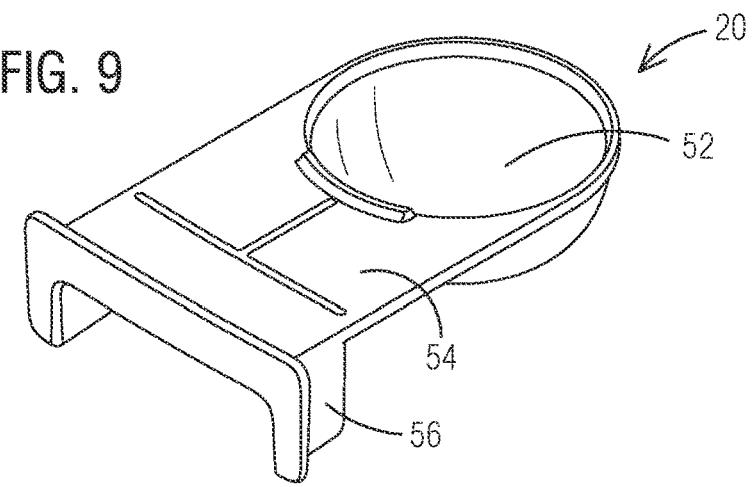
FIG. 9 is a top perspective view of the cup.
Figure 10:
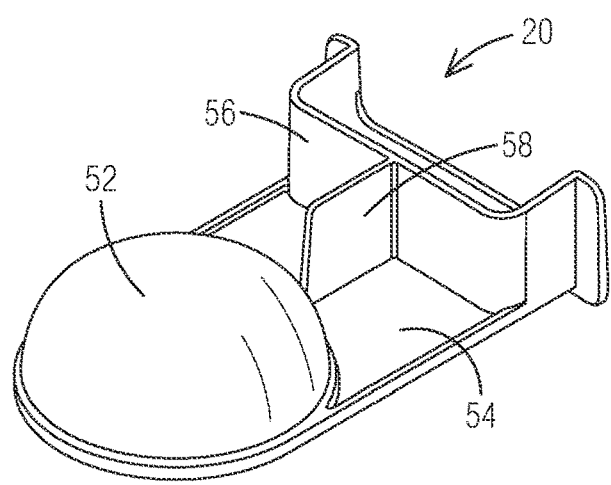
FIG. 10 is a bottom perspective view the cup.

With reference to FIGS. 9 and 10 the cup 20 will be described. The cup 20 includes an upwardly opening cavity 52, and a handle 54 extending from the cavity 52. As may be envisioned, the cavity 52 will receive a quantity of the dry food 24, and the handle 54 will allow the user to grasp and manipulate the cup 20. For stability it is preferred (but not required) that handle 54 include a foot 56 spaced from the cavity 52 to help support the cup 20 to rest upon a flat surface without tipping. In the preferred embodiment shown, the foot 56 further includes a slide rib 58 to help maintain the cup in the upright position during movement into and out of the cup slot 36. As noted, in the preferred form the cavity 52 is semi-hemispherical as shown, and thus cup slot 36 and closed end 38 take their mating semi-circular shapes. The cavity 52 (and thus cup slot 36 and closed end 38) may take other shapes such as rectangular, trapezoidal, etc.

Figure 11:
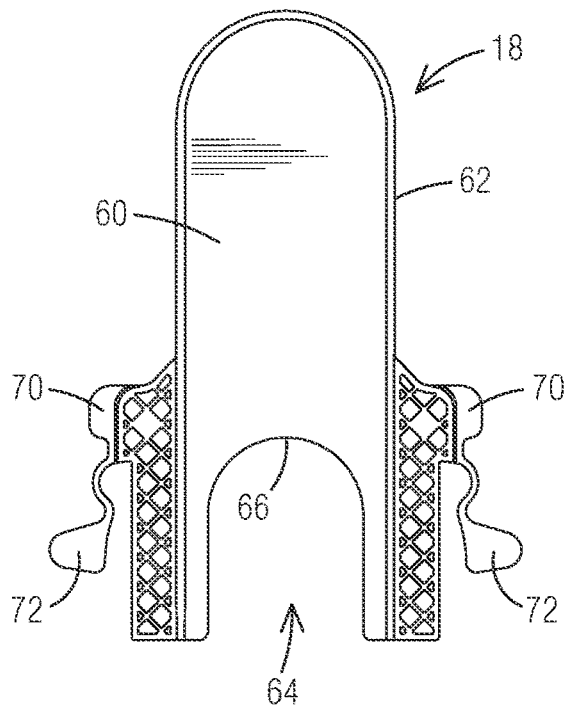
FIG. 11 is a top view the slider.
Figure 12:
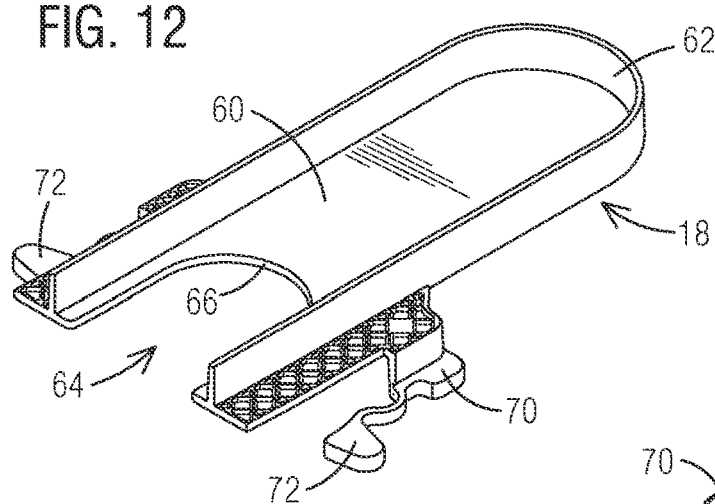
FIG. 12 is a top perspective view thereof.
Figure 13:
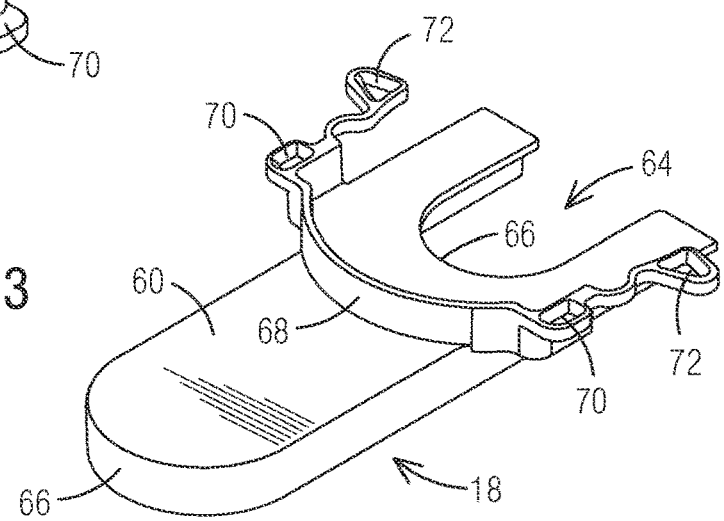
FIG. 13 is a bottom perspective view thereof.

The slider 18 will be described in detail with reference to FIGS. 11-13. Slider 18 includes a blocking plate 60 in the form of an elongated plane. A guide wall 62 extends upward from the longitudinal sides, and from the rear end of the blocking plate 60. The front end of blocking plate 60 includes a slide notch 64 extending inwardly to a closed end 66. A cup stop 68 extends downwardly from the blocking plate 60 at a position spaced inwardly of the closed end 66 of slide notch 64. The slider 18 further includes at least one guide block 70 extending from a lateral side of blocking plate 60. The guide block 70 mounts a biased cam clamp 72 extending forwardly of the cup stop 68, and the guide block 70 is extending below the blocking plate 60 similar to the cup stop 68.

Figure 14:
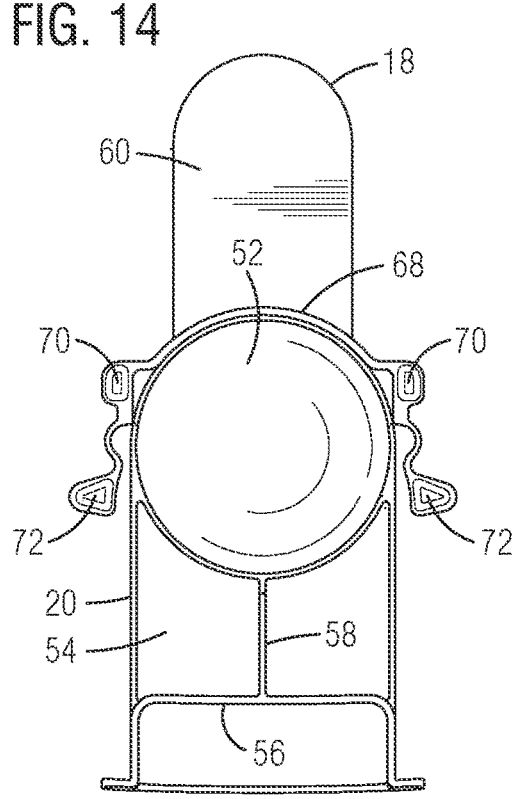
FIG. 14 is a detail bottom view of slider and cup unengaged.
Figure 15:
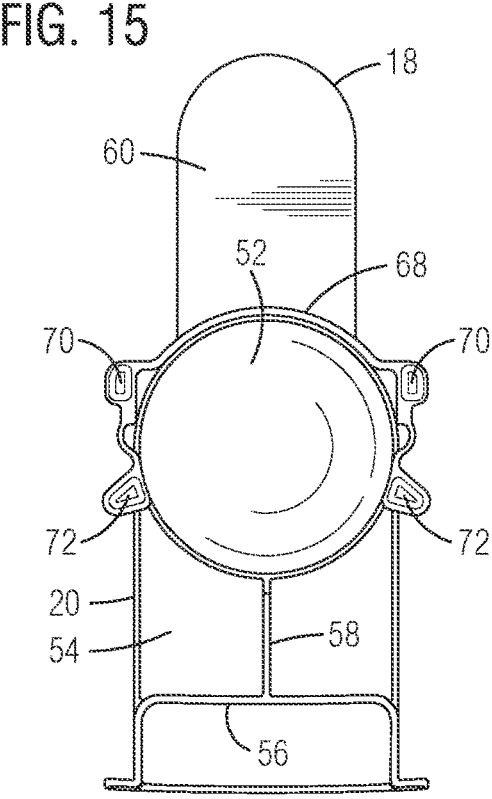
FIG. 15 is a detail bottom view of slider and cup engaged.

In the preferred embodiment shown, the at least one guide block 70 is a pair of guide blocks 70 extending from each lateral side of blocking plate 60, and are guide blocks 70 are sized and positioned such that the guide blocks 70 will be received in the cam ledges 40 for sliding reciprocation within and along the cam ledges 40 as the slider 18 moves toward and away from the cup opening 32 between storage and dispensing positions. The biased cam clamps 72 are formed such that in their relaxed state (FIGS. 11-14) they extend laterally outward, but may be elastically biased laterally inward to a compressed state (FIG. 15). In the preferred embodiment shown, the slider 18 is formed as a monolithic injection-molded piece, and the elastic nature of the plastic used to form slider 18 creates a biased living hinge between slide block 70 and cam clamp 72. As illustrated by comparison of FIGS. 14 and 15, the cup stop 68 and cam clamps 72 are arranged such with the cavity 52 abutting the cup stop 68, the cam clamps 72 may partially surround the cavity 52 of cup 20 (FIG. 15).

Figure 16:
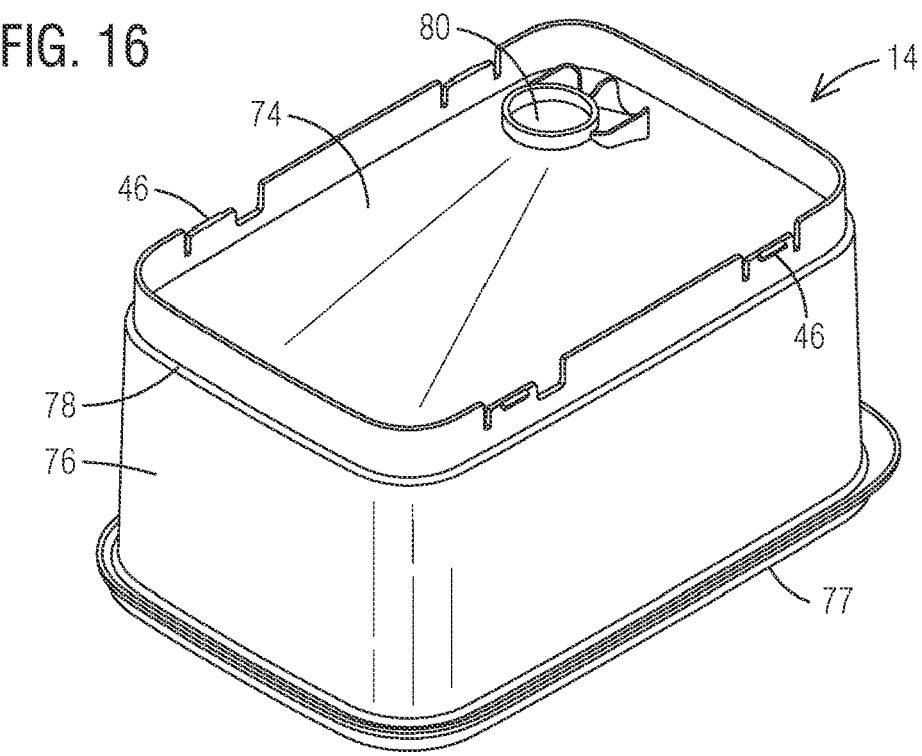
FIG. 16 is a bottom perspective view of the hopper.
Figure 17:
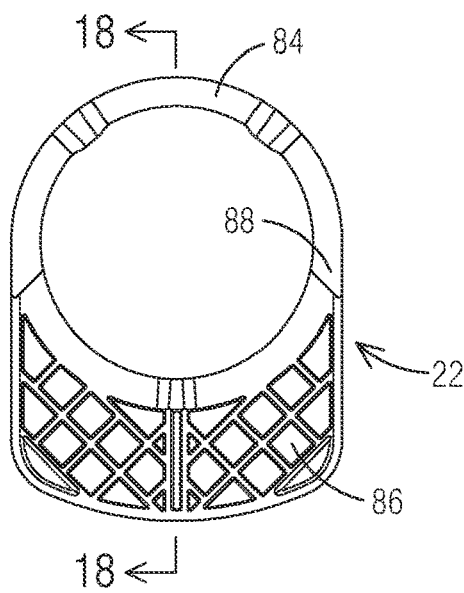
FIG. 17 is a top view of the scraper.

The hopper 14 is best shown in FIGS. 2, 3 and 16. The hopper 14 is generally a concave storage bin including a bottom wall 74 and one or more side walls 76 extending upward from the bottom wall, with the side walls 76 ending in a rim 78. The cover 16 will rest upon (or more preferably be releasably sealed to) this rim 77. As with the base 12, in the preferred form the bottom wall 74 has a generally rectangular periphery, and there are four side walls 76, but other arrangements are possible. At least a portion of the side wall 76 may include a ledge 78 to engage the rim 30 of base 12 to support the hopper 14 on base 12 as shown in FIGS. 1 and 3.

Figure 18:
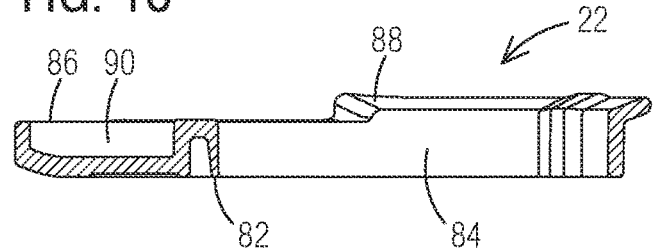
FIG. 18 is a cross-sectional view a long line 18-18 of FIG. 17.
Figure 19:
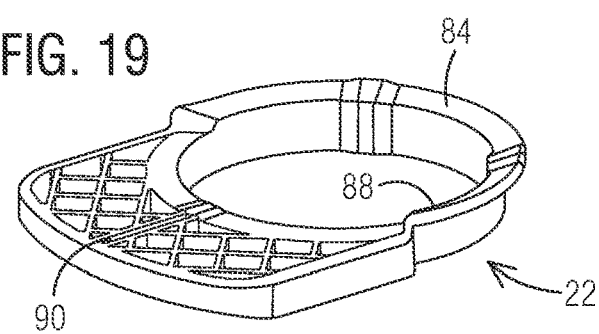
FIG. 19 is a top perspective view of the scraper.
Figure 20:
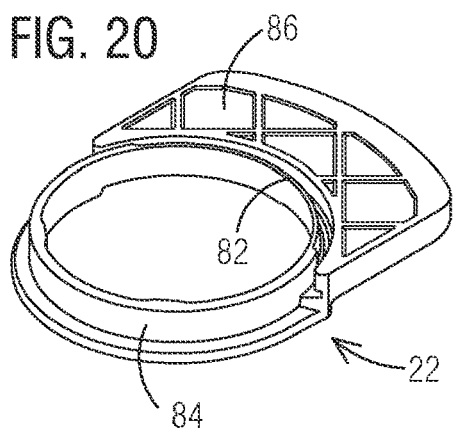
FIG. 20 is a bottom perspective view of the scraper.
Figure 21:
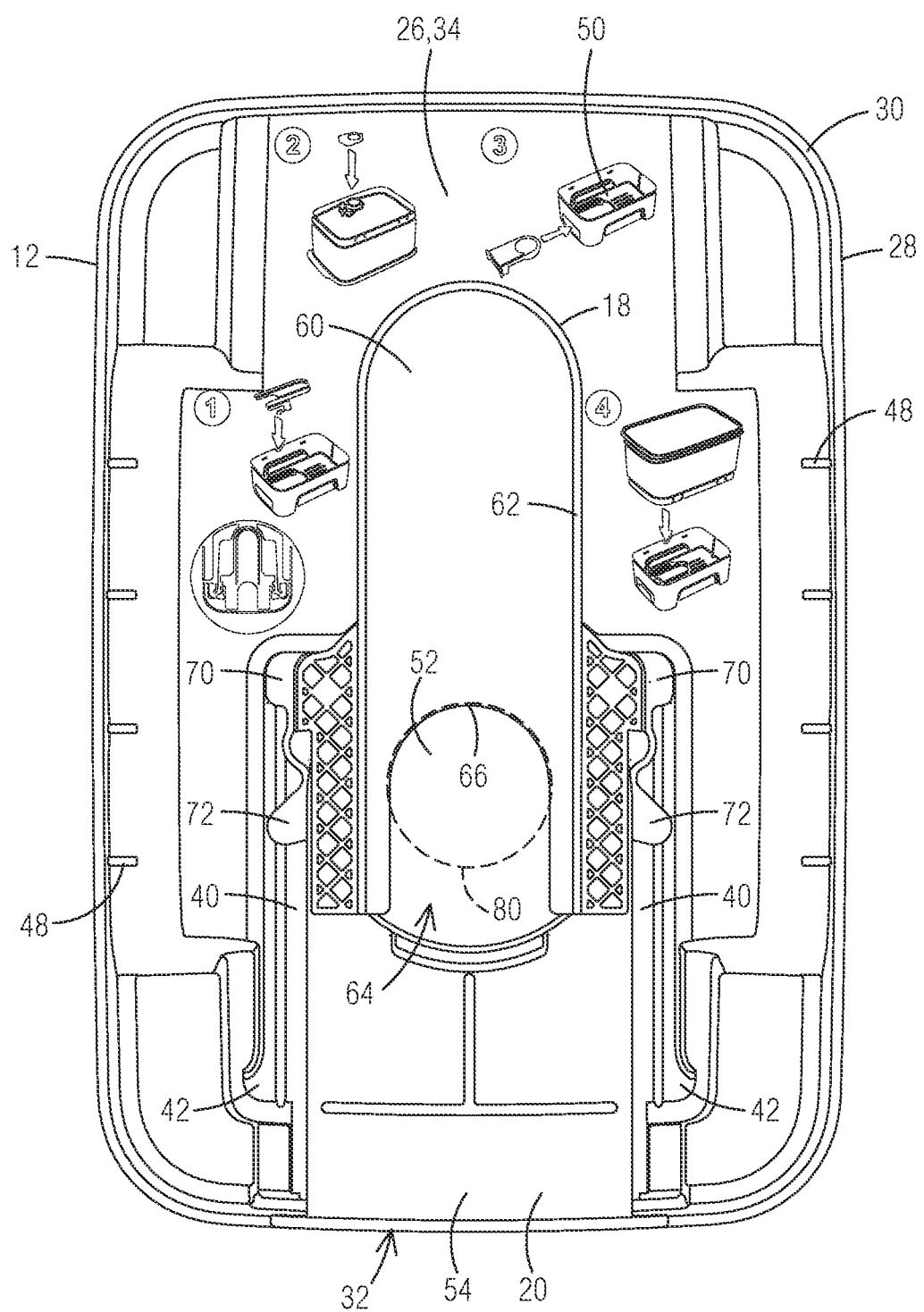
FIG. 21 is a detail top view of slider and cup in the storage position.
Figure 22:
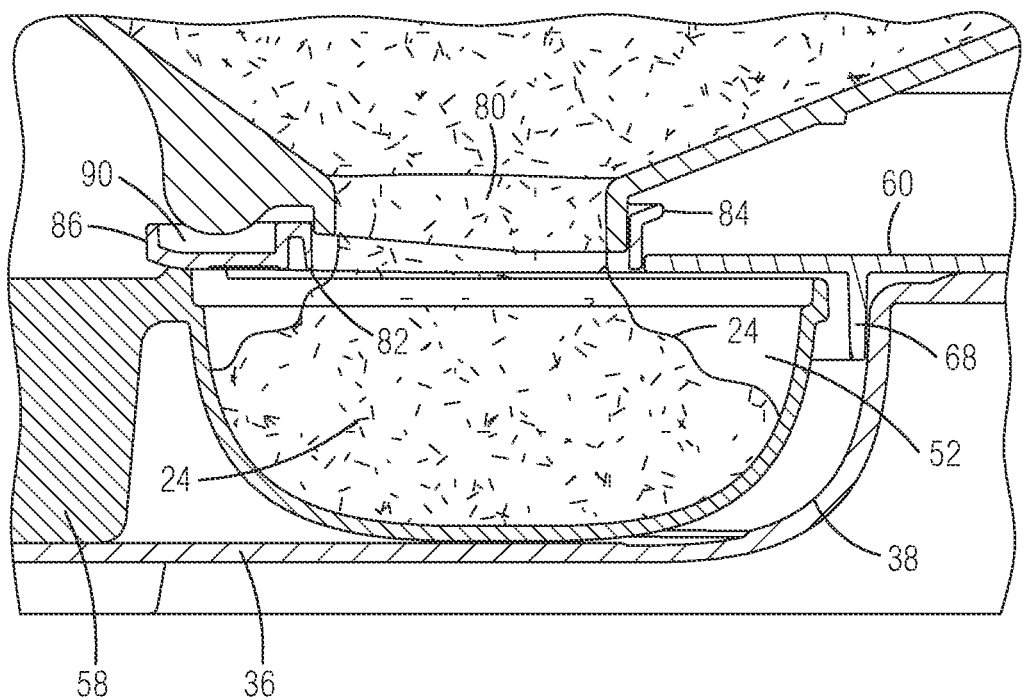
FIG. 22 is a detail cross-sectional view illustrating the scraper in the storage position.

As best shown in FIGS. 3 and 18, the bottom wall 74 is formed as funnel leading downward to an aperture 80, with the aperture 80 being sized to adequately allow the dry food 24 to flow through by gravity. The funnel depth of the bottom wall 74 is set such when assembled (as in FIGS. 1 and 3) the aperture 80 will have a close sliding fit against the blocking plate 60 of slider 18 which may fully block aperture 80. In particular, this fit is intended to substantially prevent dry food 24 from exiting the aperture 80 when fully blocked by blocking plate 60. The aperture 80 is also formed to overlie the cavity 52 of cup 20 when cup 20 is operatively inserted into the base 20 at its storage position (FIGS. 3, 21 and 22). Similarly, the slide notch 64 of slider 18 has a width closely similar to that of aperture 80, and this slide notch 64 is placed on blocking plate 60 at a location to underlie the aperture 80 when of the slider 18 is at the storage position. As best illustrated in FIG. 21, the closed end 66 of the slide notch 64 is also located adjacent the aperture 80 when the slide 18 is in the storage position.

The operation of dispenser 10 will be described with reference to FIGS. 3 and 21-24. The storage position of dispenser 10 and its components is shown in FIGS. 3, 21 and 22. In this storage position the slider 18 is fully inserted within the base 12, with the guide blocks 70 and cam clamps 72 received in their associate cam ledges 40, and the cup stop 68 at or near the closed end 38 of cup slot 36. While other components could be used, it is preferred that the slider 18 is prevented from further inward movement (and thus stopped in the storage position) by 1) abutment of the guide blocks 70 against the ends of the cam ledges 40; 2) abutment of the cup stop 68 against the closed end 38; or 3) both 1 and 2. The slide notch 64 and closed end are closely surrounding, but not substantially blocking, the aperture 80 of hopper 14.

The cup 20 is also at its maximum insertion into cup slot 36 in this storage position. In the preferred embodiment shown, the length of handle 54 of cup 20 is sized to align with cup opening 32 in this storage position for aesthetic purposes. The cavity 52 of cup 20 is located beneath the aperture 80. As such, and as illustrated in FIG. 22, the dry food 24 may freely flow from the hopper 14 through the slide notch 64 and into the cavity 52 of cup 20. As the cavity 52 is filled with the dry food 24, the dry food 24 already dispensed into cup 20 will serve to block further flow of dry food 24 through the aperture 80. As such, when in the storage position the dry food 24 will fill the cavity 52 only partially as illustrated in FIG. 22.

As shown in FIG. 3, the cup 20 is abutting against or closely adjacent to the cup stop 68 of slider 18. With this position relative to slider 18, and with the cam clamps 72 in their compressed state due to cam ledges 40, the cup 20 will be retained by slider 18 as shown in FIG. 15. In particular, inward movement of cup 20 relative to slider 18 is blocked due to cup stop 68, and outward movement of cup 20 relative to slider 18 is blocked due to cam clamps 72. As such, cup 20 and slider 18 will move together as a unit at this position. When the user manually pulls outward upon handle 54, the cup 20 and slider 18 will both slide outward together as a unit. In particular, the cup 20 will abut against the cam clamps 72 and outward motion of the cup 20 will similarly force the cam clamps 72 (and thus the slider 18) outward.

Figure 23:
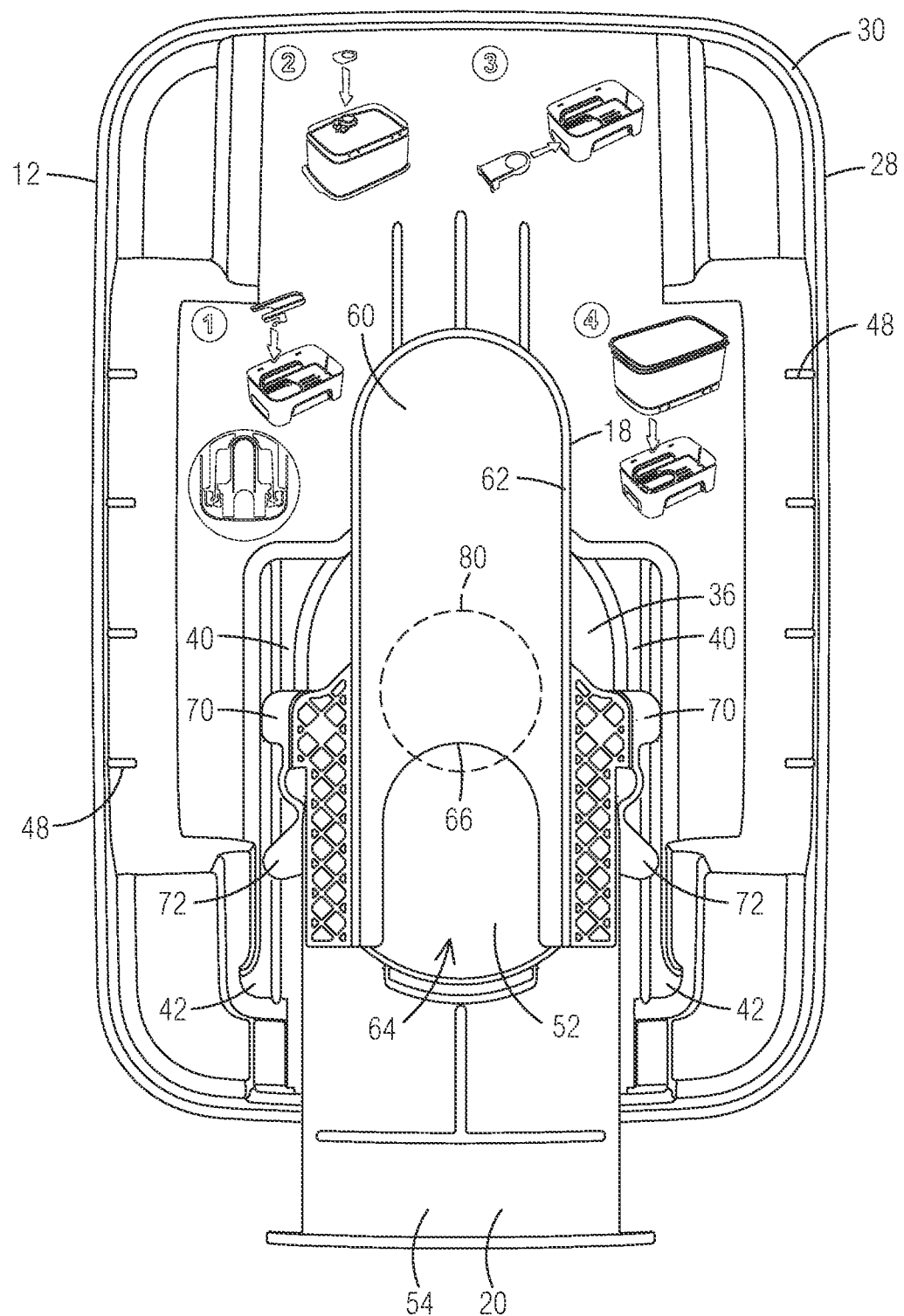
FIG. 23 is a detail top view of slider and cup in partially open position.

An intermediate position during this sliding outward is shown in FIG. 23. Here, the cup 20 is still retained by slider 18, as the cam clamps 72 are still positioned within the cam ledges 40 and are thus forced into their compressed state about the cavity 52. The handle 54 of cup 20 extends partially from the cup opening 32. With movement of slider 18, the closed end 66 of slide notch 64 has moved within the periphery of aperture 80, and as such the blocking plate 60 is partially closing the aperture 80. As may be envisioned, with further outward movement the closed end 66 will approach the opposite periphery of the aperture 80 closer and closer, until the closed end 66 passes beyond the periphery of aperture 80 and the blocking plate 60 fully closes the aperture 80 of hopper 14 and prevents dispensing from the hopper.

The dispensing position is shown in FIG. 24. With further manual movement of the cup 20 outward, the cup 20 will eventually draw the slider 18 out to the point that the cam clamps 72 enter the free end 42 of the cam ledges 40, and the cam clamps 72 expand to their relaxed state (FIG. 14). With the cam clamps 72 relaxed and expanding outward, they no longer abut the cup 20 and the cup 20 is no longer connected to slider 18 as a unit. As shown in FIG. 24, the slider 18 will thus cease outward movement. At this dispensing position of the slider 18, the blocking plate 60 fully closes the aperture 80 of hopper 18 preventing flow of dry food 24. Any dry food 24 which has inadvertently escaped onto the surface of blocking plate 60 will be contained by the guide wall 62. Further manual movement of the handle 54 will thus draw the cup 20 outward by itself, as shown in FIG. 24. Continued manual movement will result in the cup 20 being fully removed from the base 12, with the cavity 52 filled with dry food 24. At this point the user may manually pour the dry food into a cooking pot, mixing bowl, serving bowl, etc.

Movement from the dispensing position back into the storage position is generally the opposite of that described above. The user will manually insert the cup 20 into the cup slot 32 and begin sliding the cup 20 into cup slot 36, corresponding to FIG. 24. Continued insertion will eventually result in the cup 20 abutting the cup stop 68 on slider 18. From this point on, further manual insertion of the cup 20 will also push the slider 18 inward. As the slider 18 moves inward, the cam clamps 72 will exit the free ends 42 and enter the cam ledges 40. This will cause the cam clamps to move from the relaxed state to the compressed state, as illustrated in FIG. 23. During this movement of the slider 18 the blocking plate 60 has been sliding beneath the aperture 80. Eventually the closed end 66 of slide notch 64 will cross the periphery of the aperture 18 and the aperture 18 will begin to be opened, again as illustrated in FIG. 23. The cavity 52 of cup 20 is already positioned below aperture 80 at this point, and as such the dry food 24 will begin flowing once again into the empty cavity 52.

Continued insertion of the cup 20 and slider 18 combined unit will eventually cause the slider 18 or cup 20 to engage with an abutment preventing further insertion. As noted, this could be the cup stop 68 abutting the closed end 38 of cup slot 34, or the guide blocks 70 abutting the closed end of the cam ledges 40, or the cup 20 itself engaging the base 12 in some manner (such as by foot 56 abutting a mating section of cup slot 36). At this point the slider 18 will be fully inserted into the storage position, and as such the closed end 66 will have passed beyond the aperture 80 and the aperture 80 will be fully surrounded by slide notch 63 and thus fully open for dispensing. As noted before, this flow of dry food 24 into the cup 20 will eventually be blocked by the accumulation of dry food itself. In this manner a repeatable quantity of dry food 24 may be dispensed via cup 20.

While this description provides a working example, there are certain improvements to this basic invention which may be desirable. A first is the shape for the aperture 80 and closed end 66 of the slide notch 64. As generally described, the aperture could take various shapes including square, hexagonal, etc. Envision the aperture 80 is formed as a square, and closed end 66 is a matching flat wall perpendicular to the slide notch 64. As the closed end 66 moves toward the dispensing position and to close the aperture 80, the two flat edges of these elements coming together may be prone to clamping dry food 24 between themselves. This could block closing, or cause breakage of the dry food 24 to force further movement of the slide 18. The preferred embodiment, however, is that shown and in particular for the aperture 80 to be circular, and the closed end 66 to be semi-circular. Forming the aperture 80 and closed end 66 in this manner causes the two elements to create a lens shape during closing of aperture 80, as illustrated in FIG. 23. The angular and curved meeting points between these elements as the aperture 80 is being closed can serve to lead granules of dry food 24 toward either hopper 14 or cup 20 and provide smoother closing. As such, these circular forms are preferred.

Another potential improvement is to provide aperture 80 with a scraper portion 82. The scraper portion 82 will take the form of a section of reduced thickness and increased flexibility, similar to a wiper blade. This scraper portion will be located adjacent the cup opening 32, such that the scraper portion 82 is the final portion of aperture 80 encountered by the closed end 66 as slider 18 moves from the storage to the dispensing positions. The scraper portion may be formed monolithically with the hopper 14 (not shown). In the preferred embodiment, the scraper portion 82 is created by a hopper cap 84 secured to hopper 14 at the aperture 80. The hopper cap 84 may thus be formed of a different, more pliable material than that used for hopper 14, such as silicone or a flexible polypropylene. As shown in FIGS. 17-20 and 22, the hopper cap 84 has a shape to closely receive and form a secure fit to hopper 14, such as by threading (not shown) or a press friction fit.

The hopper cap 84 may include various features for ease of use, such as a tab 86 to easily remove the hopper cap 84 for cleaning. The hopper cap 84 may also include areas 88 of increased height and/or various mating tab/slot combinations 90 to ensure the hopper cap 84 may be mounted only in the proper position. In this preferred form of circular aperture 80, the scraper portion covers approximately 60 degrees, and with comparison to the lens area of closing aperture 80 in FIG. 23, it may be seen that scraper portion 84 will be the last portion of aperture 80 to interact with the closed end 66 during closing of the aperture. The increased flexibility and reduced thickness of the scraper portion 84 will assist in moving dry food 24 out of the way to improve closing of aperture 80. Given that the scraper portion 82 and hopper cap 84 are each independently optional, the term "aperture means" shall be used to refer to this generally. In particular, the term "aperture means" is intended to encompass: an aperture 80 with or without a scraper portion 82; an aperture 80 without a hopper cap 84, or a hopper cap 84 mounted to the aperture 80; as well as the hopper cap 84 with or without a scraper portion 82.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A portion dispensing container, comprising:
   a base having a platform, a cup slot extending below said platform, said cup slot ending in a closed end, said cup slot having at least one cam ledge having a free end;
   a hopper supported upon said base, said hopper adapted to hold dry food for storage and dispensing, said hopper including a bottom wall formed as a funnel leading toward an aperture means for dispensing said dry food;
   a slider including a blocking plate having a slide notch extending towards a closed end of said slide notch, a cup stop extending from said blocking plate, and at least one guide block having a cam clamp for biased movement between relaxed and compressed positions, said slider being mounted within said base for reciprocation between a storage position and a dispensing position with said blocking plate sliding upon said platform, and said at least one guide block received in said at least one cam ledge, and said aperture means located above said cup slot in said storage position, and said blocking plate closing said aperture means in said dispensing position; and
   a cup sized to be received within said cup slot for reciprocation between said storage and dispensing positions, said cup including a cavity to receive said dry food, said cavity being located below said aperture means in said storage position.

2. A container as in claim 1, wherein said aperture means is circular, and said closed end of said slide notch is semi-circular.

3. A container as in claim 1, wherein said cam clamp is located within said at least one cam ledge at said storage position and is biased to said compressed position by said at least one cam ledge, and wherein said cam clamp is located beyond said free end of said at least one cam ledge at said dispensing position and is released to said relaxed position.

4. A container as in claim 3, wherein said cam clamp in said compressed position is located to secure said cup cavity between said cam clamp and said cup stop.

5. A container as in claim 4 wherein said at least one cam ledge comprises two said cam ledges, and said at least one guide block and cam clamp comprise two said guide blocks and cam clamps.

6. A container as in claim 1, wherein said aperture means includes a scraper portion having reduced thickness and increased flexibility, positioned to interact with said closed end of said slide notch as said aperture means is being fully closed by said blocking plate.

7. A container as in claim 6, wherein said aperture means further includes a hopper cap secured to said hopper.

8. A container as in claim 7, wherein said cam clamp is located within said at least one cam ledge at said storage position and is biased to said compressed position by said at least one cam ledge, and wherein said cam clamp is located beyond said free end of said at least one cam ledge at said dispensing position and is released to said relaxed position.

9. A container as in claim 8, wherein said cam clamp in said compressed position is located to secure said cup cavity between said cam clamp and said cup stop.

10. A container as in claim 9 wherein said at least one cam ledge comprises two said cam ledges, and said at least one guide block and cam clamp comprise two said guide blocks and cam clamps.

* * * * *